United States Patent

[11] 3,591,216

| [72] | Inventor | George R. Onufer |
| | | Bloomfield Hills, Mich. |
| [21] | Appl. No. | 802,448 |
| [22] | Filed | Feb. 26, 1969 |
| [45] | Patented | July 6, 1971 |
| [73] | Assignee | Russell, Burndsall & Ward Bolt and Nut Co. |
| | | Port Chester, N.Y. |

[54] BEARING FASTENER AND ASSEMBLY
8 Claims, 6 Drawing Figs.

[52] U.S. Cl................................................. 287/93,
24/213, 287/101
[51] Int. Cl.................................................. F16b 17/00
[50] Field of Search............................................ 24/73.8,
216, 213; 287/93, 101; 85/8.8

[56] References Cited
UNITED STATES PATENTS

| 2,283,125 | 5/1942 | Powell | 24/313 X |
| 3,007,725 | 11/1961 | Becker et al. | 287/93 X |
| 3,122,386 | 2/1964 | Pearson | 287/93 |
| 3,139,295 | 6/1964 | Hosen | 287/93 X |

Primary Examiner—John Petrakes
Attorney—Burton and Parker

ABSTRACT: A bearing fastener having an annular bearing portion including an annular cylindrical bearing sleeve portion and an integral radially outwardly extending annular head portion, an annular locking ring portion, and a resilient connecting portion integral with the head portion and the locking ring portion. In the bearing assembly, the bearing sleeve portion is received over a cylindrical bearing portion of a stud connecting two relatively movable members. The annular locking ring portion is received in an annular groove or notch in the stud to secure the bearing portion on the stud.

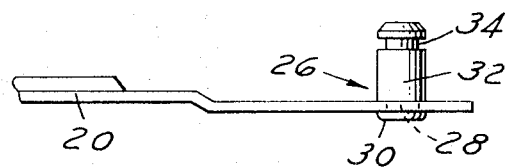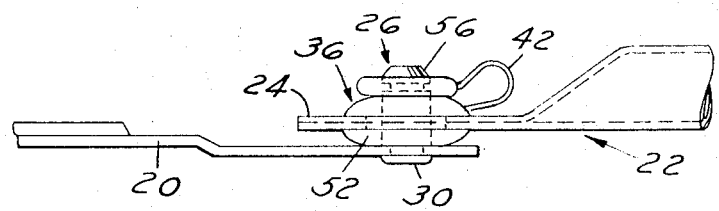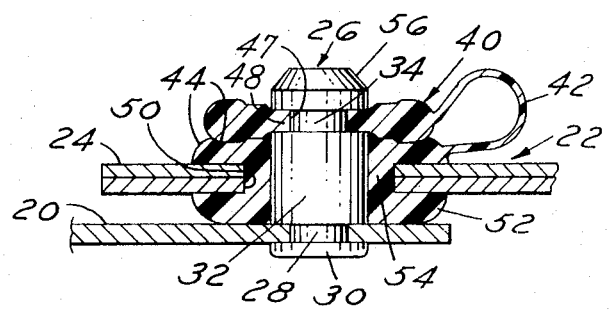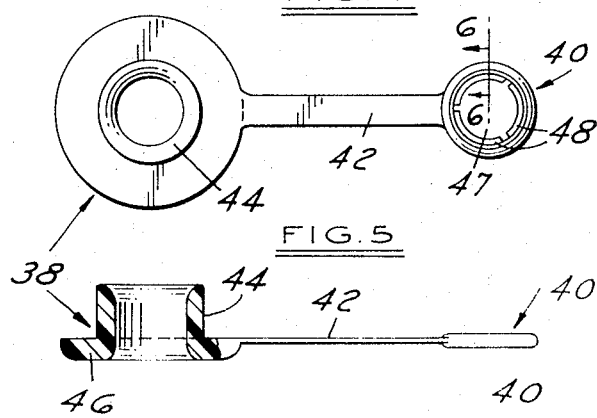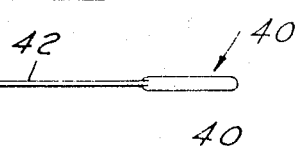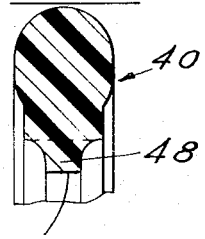
INVENTOR
GEORGE R. ONUFER
BY
Burton & Parker,
ATTORNEYS

BEARING FASTENER AND ASSEMBLY

FIELD OF THE INVENTION

This invention particularly relates to bearing members having an integral fastener element which may be utilized to secure two or more relatively movable members. More particularly, the bearing fastener of this invention may be utilized to secure an automotive throttle linkage to a transmission rod or the like, but the invention is not limited to such an application.

DESCRIPTION OF THE PRIOR ART

The automotive carburetor throttle linkage is presently secured to the transmission rod by a S-shaped sheet metal clip, which is difficult to assemble, and may be shaken loose. The more conventional bearing assemblies do not provide a positive locking means, and the conventional U-shaped locking rings may be lost during assembly, and do not cooperate with the bearing to secure the bearing in position. Further, conventional locking rings generally require a special tool for assembly.

SUMMARY OF THE INVENTION

The bearing fastener of this invention provides an integral bearing member and fastener element which may be utilized to secure two or more relatively movable members. The integral bearing fastener of this invention includes an annular bearing portion, an annular locking ring portion, and a resilient integral connecting portion. The annular bearing portion has a generally cylindrical bearing sleeve portion and an integral radially outwardly extending annular head portion. The resilient connecting portion is integral with the bearing portion and the locking ring portion, interconnecting the head portion and the ring portion.

In the preferred embodiment of the bearing fastener, the locking ring portion includes a plurality of integral resilient locking fingers extending radially inwardly into the opening of the annular locking ring portion. The resilient connecting portion comprises a thin flexible band integral with the head portion of the bearing portion and the locking ring. The axial length of the bearing sleeve portion is approximately equal to the width of the head portion and the length of the connecting portion for the reasons given hereinbelow.

The bearing fastener assembly includes a stud having a generally cylindrical bearing portion, an annular notch adjacent one end, and the stud is adapted to be secured to one of the members at the opposite end. The cylindrical bearing sleeve portion of the bearing fastener is received on the bearing portion of the stud, and is deformed to provide a central annular bearing portion encircling the bearing portion of the stud and a pair of opposed radially outwardly extending integral head portions adapted to overlie and retain a second member. The locking ring portion is disposed within the annular groove of the stud to retain the bearing portion and the second member in position.

In the preferred embodiment of the bearing fastener assembly of this invention, the resilient connecting portion tensions the integral edge of the locking ring portion away from the adjacent head portion of the bearing fastener, biasing the opposed edge against the adjacent head portion, preventing inadvertent removal of the locking ring. The bearing fastener may be formed of a resilient plastic material having a low coefficient of friction, and the opposed surfaces of the head portions are preferably smooth to provide a smooth bearing surface.

BRIEF DESCRIPTION OF THE DRAWINGS

FIG. 1 is a side view of a portion of an automotive throttle linkage;

FIG. 2 is a side view of the bearing fastener assembly of this invention;

FIG. 3 is a side partially cross-sectional view of the bearing assembly shown in FIG. 2;

FIG. 4 is a top view of the bearing fastener of this invention;

FIG. 5 is a side partially cross-sectional view of the bearing fastener shown in FIG. 4; and FIG. 6 is a cross-sectional view of a portion of the bearing fastener shown in FIG. 4, in the direction of view arrows 6–6.

DESCRIPTION OF THE PREFERRED EMBODIMENT

The bearing fastener of this invention is adapted to provide bearing support for two relatively movable members, and retain the members in proper alignment. The members retained in the disclosed embodiment are the automotive carburetor throttle linkage 20 and the transmission rod 22, although it will be understood that the invention is not limited to this particular application. The disclosed transmission rod is a tubular member having a flattened end portion 24 rotatively secured to the throttle linkage 20.

A throttle linkage stud 26 is secured adjacent the end of the linkage member 20 by receiving a reduced diameter end portion 28 through an aperture in the linkage member and riveting or otherwise securing the end of the stud. In this embodiment, the assembled stud has as enlarged end 30 retaining the stud in the linkage member. The stud includes a cylindrical bearing portion 32 and an annular groove or notch 34 adjacent the end of the stud, opposite the linkage member 20. The bearing fastener 36 of this invention is adapted to provide bearing retention for these members.

The bearing fastener prior to assembly is shown in FIGS. 4 to 6. The integral bearing fastener includes an annular bearing portion 38, a locking ring portion 40 and a resilient connecting portion 42. The bearing portion includes a cylindrical bearing sleeve portion 44 and an annular head portion 46. The connecting portion 42 is integral with the head portion 46 of the bearing portion and the locking ring portion 40, retaining the locking ring to the bearing portion prior to assembly, and cooperative with the bearing portion after assembly to retain the members as described hereinbelow. In the disclosed embodiment, the locking ring portion has a generally circular opening 47, and a plurality of resilient locking fingers 48 which extend into the opening.

The cylindrical bearing portion 44 is initially received through an aperture 50 in the transmission rod 22, in the flattened end portion. The cylindrical end of the bearing portion is then deformed to provide a second head portion 52, opposite the head portion 46 having the integral connecting portion 42, as shown in FIG. 3. The head portions thus retain the rod member 22, and the central bearing portion 54 is received over the bearing portion 32 of the stud 26. The embodiment of the bearing fastener assembly shown in FIGS. 2 and 3 may also be secured in position over the transmission rod by splitting the bearing grommet portion, rather than deforming the cylindrical bearing sleeve.

The annular locking ring portion 40 is then disposed over the projecting end of the stud, resiliently biasing the fingers 48 over the tapered end portion 56 of the stud into the annular groove 34. In the disclosed embodiment, the length of the resilient connecting portion 42 is approximately equal to the radial width of the integral head portion 44, and is bowed between the head portion 44 and the ring portion 40. The connecting portion thus tensions the ring portion adjacent the integral connection radially outwardly and upwardly, biasing the opposed edge radially against the stud and downwardly against the adjacent head portion 44, securely retaining the bearing portion in position and the members 20 and 22 together. The integral bearing fastener of this invention thus provides rotatable bearing support for the throttle linkage 20 and the transmission rod 22, while securely retaining the members in one integral fastener.

It will be understood that the bearing fastener may be formed from various materials, including plastics and metal alloys, however the fastener is preferably formed from a resilient material having the requisite bearing qualities. I have found that plastics such as nylon, delrin and other similar plastics are suitable, however other materials may be preferred in certain other applications.

I Claim:

1. A bearing fastener assembly for attaching two platelike members for relative movement, comprising: a stud adapted to be secured at one end to one of the members and having at the opposite end an annular groove and intermediate the groove and said one end exhibiting a generally cylindrical bearing portion, and an integral bearing fastener comprising a bearing grommet portion including a central annular bearing portion encircling the bearing portion of said stud and a pair of opposed radially outwardly extending integral head portions adapted to overlie and retain the second member, an annular locking ring portion disposed within the annular groove and encircling said stud retaining said bearing grommet portion and the second member on said stud, and a resilient connecting portion integral with said bearing grommet portion and said locking ring portion interconnecting said locking ring and the adjacent head portion of said bearing grommet portion.

2. The bearing fastener assembly defined in claim 1, characterized in that said locking ring portion includes a plurality of resilient locking fingers biased against said stud within the annular groove preventing inadvertent removal of the ring.

3. The bearing fastener assembly defined in claim 2, characterized in that said resilient connecting portion tensions the integral edge of said locking ring portion, biasing the opposed edge of said ring portion against the adjacent head portion of said bearing grommet portion.

4. The bearing fastener assembly defined in claim 1, characterized in that the axial length of said bearing grommet portion is approximately equal to the axial length of the bearing portion of the stud, and said locking ring portion is received against the adjacent head portion of said bearing grommet portion.

5. The bearing fastener assembly defined in claim 4, characterized in that the length of said resilient interconnecting portion is approximately equal to the radial width of said adjacent head portion, and said connecting portion tensions the integral edge of said locking ring portion away from said adjacent head portion, biasing the opposed edge against the adjacent head portion.

6. The bearing fastener assembly defined in claim 1, characterized in that said integral bearing fastener is formed of a resilient plastic material having a low coefficient of friction.

7. A bearing fastener assembly defined in claim 1, characterized in that the opposed outer surfaces of said head portions are generally planer to provide a smooth bearing surface.

8. The bearing fastener assembly defined in claim 7, characterized in that the opposed head portions have an arcuate radially outer exterior surface.